United States Patent
Jiang et al.

(10) Patent No.: US 11,356,748 B2
(45) Date of Patent: Jun. 7, 2022

(54) METHOD, APPARATUS AND SYSTEM FOR SLICING LIVE STREAMING

(71) Applicant: Beijing Baidu Netcom Science and Technology Co., Ltd., Beijing (CN)

(72) Inventors: Zhenliang Jiang, Beijing (CN); Huifeng Shen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/675,840

(22) Filed: Nov. 6, 2019

(65) Prior Publication Data

US 2020/0245042 A1 Jul. 30, 2020

(30) Foreign Application Priority Data

Jan. 24, 2019 (CN) .......................... 201910068514.3

(51) Int. Cl.
*G06F 15/16* (2006.01)
*H04N 21/845* (2011.01)
*H04L 65/60* (2022.01)
*H04N 21/2343* (2011.01)
*H04N 21/2187* (2011.01)
(Continued)

(52) U.S. Cl.
CPC ..... *H04N 21/8456* (2013.01); *H04L 65/4084* (2013.01); *H04L 65/602* (2013.01); *H04L 65/605* (2013.01); *H04L 65/608* (2013.01); *H04N 21/2187* (2013.01); *H04N 21/231* (2013.01); *H04N 21/232* (2013.01); *H04N 21/2343* (2013.01); *H04N 21/2353* (2013.01); *H04N 21/23605* (2013.01); *H04N 21/262* (2013.01); *H04N 21/26258* (2013.01)

(58) Field of Classification Search
CPC .................................................. H04N 21/8456
See application file for complete search history.

(56) References Cited

U.S. PATENT DOCUMENTS

| | | | |
|---|---|---|---|
| 2014/0137168 A1 | 5/2014 | Takahashi et al. | |
| 2015/0067722 A1* | 3/2015 | Bjordammen | G06Q 30/0253 725/32 |

(Continued)

FOREIGN PATENT DOCUMENTS

| | | |
|---|---|---|
| CN | 102271163 A | 12/2011 |
| CN | 102710966 A | 10/2012 |

(Continued)

OTHER PUBLICATIONS

"Research and implementation of P2P CDN streaming media distribution technologies"; in Chinese, with English translation of Abstract only; dated Mar. 12, 2011 (77 pages).

(Continued)

*Primary Examiner* — Richard G Keehn
(74) *Attorney, Agent, or Firm* — Nixon Peabody LLP (57) ABSTRACT

Embodiments of the present disclosure relate to a method, apparatus, and system for slicing live streaming. A method may include: acquiring the live streaming from a live source station server; slicing the live streaming to generate an index file and sliced files of the live streaming; and sending the index file and the sliced files of the live streaming to an object storage server, to cause the object storage server to store the index file and the sliced files of the live streaming.

13 Claims, 5 Drawing Sheets

(51) Int. Cl.
*H04N 21/262* (2011.01)
*H04N 21/231* (2011.01)
*H04N 21/235* (2011.01)
*H04N 21/232* (2011.01)
*H04N 21/236* (2011.01)
*H04L 65/612* (2022.01)
*H04L 65/65* (2022.01)

(56) References Cited

U.S. PATENT DOCUMENTS

| | | | | |
|---|---|---|---|---|
| 2015/0095964 A1* | 4/2015 | Teixeira | ................ | H04L 65/602 |
| | | | | 725/116 |
| 2015/0215661 A1* | 7/2015 | Wang | ...................... | H04L 69/08 |
| | | | | 725/109 |
| 2015/0229688 A1 | 8/2015 | Zhou | | |
| 2017/0208366 A1 | 7/2017 | Tokumo et al. | | |
| 2017/0245022 A1* | 8/2017 | Wang | ................ | H04N 21/2187 |
| 2018/0192003 A1* | 7/2018 | Gero | ........................ | H04L 65/80 |
| 2018/0192156 A1* | 7/2018 | Xu | ...................... | H04N 21/2343 |
| 2019/0221001 A1* | 7/2019 | Dassa | ...................... | H04L 67/02 |

FOREIGN PATENT DOCUMENTS

| | | |
|---|---|---|
| CN | 103650523 A | 3/2014 |
| CN | 104394443 A | 3/2015 |
| CN | 108391176 A | 8/2018 |
| JP | 2010191774 A | 9/2010 |
| JP | 2017130957 A | 7/2017 |
| JP | 2018186524 A | 11/2018 |

OTHER PUBLICATIONS

"Design and Implementation of HLS Streaming Media Server"; in Chinese, with machine translation of Chapters 3 and IV; dated Jan. 5, 2014 (45 pages).

* cited by examiner

METHOD, APPARATUS AND SYSTEM FOR SLICING LIVE STREAMING

This application claims priority to Chinese Patent Application No. 201910068514.3, filed on Jan. 24, 2019, titled "Method, apparatus, and system for slicing live streaming," which is hereby incorporated by reference in its entirety.

TECHNICAL FIELD

Embodiments of the present disclosure relate to the field of computer technology, and particularly to a method, apparatus, and system for slicing live streaming.

BACKGROUND

The HLS (HTTP Live Streaming) protocol is a streaming media transfer protocol based on HTTP (HyperText Transfer Protocol), is widely used in the field of Internet video broadcast, and is one of the prevailing Internet live stream protocols at present.

Compared with other common Internet live stream protocols, the biggest difference of the HLS protocol is that, the HLS protocol slices live streaming into continuous and very short duration of TS (Transport Stream) files in a server, while a live stream viewing user continuously downloads and plays these TS files. The server will always generate new TS files from latest live streaming. Thus, the live stream viewing user can achieve live stream as long as continuously playing the TS files acquired from the server in sequence.

At present, the HLS protocol pulls stream from an edge node of a CDN (Content Delivery Network) to a live source station server, and locally converts the live streaming to generate a M3U8 file and the TS files, which are referred to as edge slices of HLS. The specific process of obtaining the edge slices of HLS is as follows: the live stream viewing user initiates a live stream request to the edge node of the CDN, and a load balancing server of the edge node of the CDN forwards the live stream request to a back-end streaming server of the edge node of the CDN based on a load balancing strategy. The back-end streaming server first queries whether the M3U8 file and the TS files of requested live streaming are stored locally, then initiates a request for returning to a source station to a CDN node of a nearest higher level if the M3U8 file and the TS files of the requested live streaming are not stored locally, and then continues to return to a source station of a higher level nearest to the nearest higher level if the requested live streaming is not stored at the CDN node of the nearest higher level, until returning to the live source station server. The back-end streaming server pulls stream from the live source station server, encapsulates stream into the M3U8 file and the TS files locally, and sends the files to the live stream viewing user, such that the live stream viewing user watches the live stream.

SUMMARY

Embodiments of the present disclosure present a method, apparatus, and system for slicing live streaming.

In a first aspect, an embodiment of the present disclosure provides a method for slicing live streaming. The method is applied to an HTTP Live Streaming (HLS) source station server, and includes: acquiring the live streaming from a live source station server; slicing the live streaming to generate an index file and sliced files of the live streaming; and sending the index file and the sliced files of the live streaming to an object storage server, to cause the object storage server to store the index file and the sliced files of the live streaming.

In some embodiments, the method further includes: receiving a live stream request sent by an edge node server of a Content Delivery Network (CDN), where the live stream request is sent by a terminal device of a live stream viewing user to the edge node server of the CDN; determining whether the object storage server stores an index file of requested live streaming; acquiring, in response to that the object storage server stores the index file of the requested live streaming, the index file of the requested live streaming from the object storage server; and sending the index file of the requested live streaming to the edge node server of the CDN, to cause the edge node server of the CDN to send the index file of the requested live streaming to the terminal device.

In some embodiments, the acquiring the live streaming from a live source station server includes: acquiring, in response to that the object storage server does not store the index file of the requested live streaming, the requested live streaming from the live source station server.

In some embodiments, the method further includes: acquiring the sliced files of the requested live streaming; and sending the sliced files of the requested live streaming to the edge node server of the CDN, to cause the edge node server of the CDN to send the sliced files of the requested live streaming to the terminal device.

In a second aspect, an embodiment of the present disclosure provides an apparatus for slicing live streaming. The apparatus is provided in an HTTP Live Streaming (HLS) source station server, and includes: a first acquiring unit configured to acquire the live streaming from a live source station server; a slicing unit configured to slice the live streaming to generate an index file and sliced files of the live streaming; and a first sending unit configured to send the index file and the sliced files of the live streaming to an object storage server, to cause the object storage server to store the index file and the sliced files of the live streaming.

In some embodiments, the apparatus further includes: a receiving unit configured to receive a live stream request sent by an edge node server of a Content Delivery Network (CDN), where the live stream request is sent by a terminal device of a live stream viewing user to the edge node server of the CDN; a determining unit configured to determine whether the object storage server stores an index file of requested live streaming; a second acquiring unit configured to acquire, in response to that the object storage server stores the index file of the requested live streaming, the index file of the requested live streaming from the object storage server; and a second sending unit configured to send the index file of the requested live streaming to the edge node server of the CDN, to cause the edge node server of the CDN to send the index file of the requested live streaming to the terminal device.

In some embodiments, the first acquiring unit is further configured to: acquire, in response to that the object storage server does not store the index file of the requested live streaming, the requested live streaming from the live source station server.

In some embodiments, the apparatus further includes: a third acquiring unit configured to acquire the sliced files of the requested live streaming; and a third sending unit configured to send the sliced files of the requested live streaming to the edge node server of the CDN, to cause the edge node server of the CDN to send the sliced files of the requested live streaming to the terminal device.

In a third aspect, an embodiment of the present disclosure provides a system for slicing live streaming, including: a live source station server, an HTTP Live Streaming (HLS) source station server, and an object storage server. The HLS source station server is configured to acquire the live streaming from the live source station server, slice the live streaming to generate an index file and sliced files of the live streaming, and send the index file and the sliced files of the live streaming to the object storage server. The object storage server is configured to store the index file and the sliced files of the live streaming.

In some embodiments, the system further includes a terminal device of a live stream viewing user, a scheduling server of a Content Delivery Network (CDN), and an edge node server of the CDN. The terminal device is configured to send a request for parsing a live stream domain name to the scheduling server of the CDN, where the request for parsing a live stream domain name includes the live stream domain name; the scheduling server of the CDN is configured to parse the live stream domain name into a Virtual Internet Protocol address (VIP) of the edge node of the CDN, and send the VIP to the terminal device; the terminal device is further configured to send a live stream request to the edge node server of the CDN based on the VIP; the edge node server of the CDN is configured to send the live stream request to the HLS source station server; the HLS source station server is further configured to determine whether the object storage server stores the index file of requested live streaming, and acquire, in response to that the object storage server stores the index file of the requested live streaming, the index file of the requested live streaming from the object storage server; and the edge node server of the CDN is further configured to acquire the index file of the requested live streaming from the HLS live source station server, and send the index file of the requested live streaming to the terminal device.

In some embodiments, the HLS source station server is further configured to acquire, in response to that the object storage server does not store the index file of the requested live streaming, the requested live streaming from the live source station server.

In some embodiments, the HLS source station server is further configured to acquire the sliced files of the requested live streaming, and send the sliced files of the requested live streaming to the edge node server of the CDN; and the edge node server of the CDN is further configured to send the sliced files of the requested live streaming to the terminal device.

In a fourth aspect, an embodiment of the present disclosure provides a server, including: one or more processors; and a storage apparatus, storing one or more programs thereon, where the one or more programs, when executed by the one or more processors, cause the one or more processors to implement the method according to any one implementation in the first aspect.

In a fifth aspect, an embodiment of the present disclosure provides a computer readable medium, storing a computer program thereon, where the computer program, when executed by a processor, implements the method according to any one implementation in the first aspect.

The method, apparatus, and system for slicing live streaming provided in the embodiments of the present disclosure first acquire the live streaming by an HLS source station server from a live source station server; then slice the live streaming to generate an index file and sliced files of the live streaming; and finally send the index file and the sliced files of the live streaming to an object storage server, such that the object storage server stores the index file and the sliced files of the live streaming. The live streaming is sliced by the HLS source station server, and the obtained index file and sliced files are stored by the object storage server. When a terminal device of a live stream viewing user initiates a live stream request, the HLS source station server acquires the live streaming from the live source station server, slices the live streaming to generate a M3U8 file and TS files of the requested live streaming, or acquires the M3U8 file and the TS files of requested live streaming from the object storage server, and returns the M3U8 file and the TS files to the terminal device of the live stream viewing user, thus contributing to reducing the delay in live stream.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
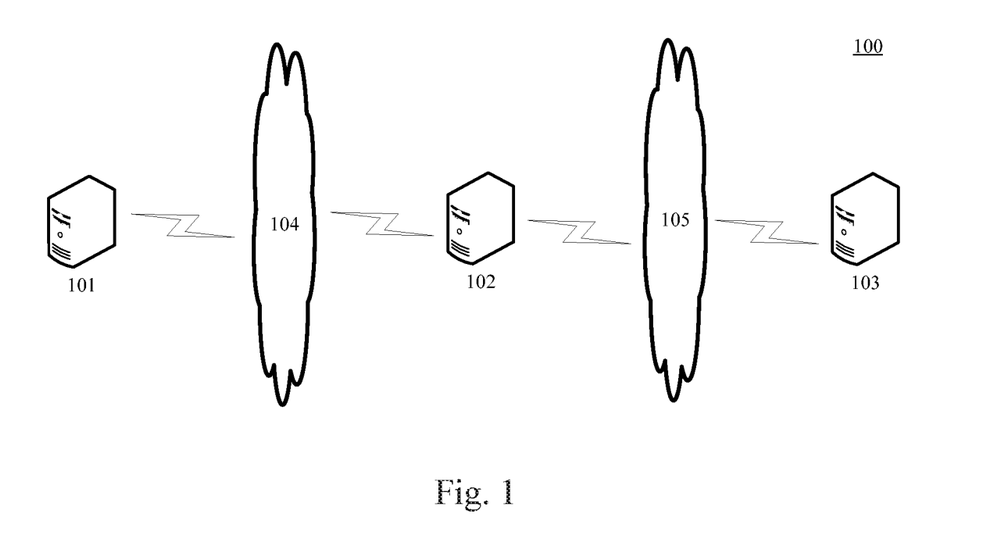
FIG. 1 is an architectural diagram of an exemplary system in which embodiments of the present disclosure may be implemented.

FIG. 1 shows an exemplary system architecture 100 in which a method for slicing live streaming or an apparatus for slicing live streaming of embodiments of the present disclosure may be implemented.

As shown in FIG. 1, the system architecture 100 may include a live source station server 101, an HLS source station server 102, an object storage server 103, and networks 104 and 105. The network 104 serves as a medium providing a communication link between the live source station server 101 and the HLS source station server 102. The network 105 serves as a medium providing a communication link between the HLS source station server 102 and the object storage server 103. The networks 104 and 105 may include various types of connections, such as wired or wireless communication links, or optical fibers.

The HLS source station server 102 may interact with the live source station server 101 via the network 104, and may further interact with the object storage server 103 via the network 105, for example, to receive or send messages.

The live source station server 101 may be configured to store the live streaming. The object storage server 103 may be configured to store the index file and the sliced files of the live streaming. The HLS source station server may be configured to acquire the live streaming from the live source station server 101; slice the live streaming to generate an index file and sliced files of the live streaming; and send the index file and the sliced files of the live streaming to the object storage server 103, such that the object storage server 103 stores the index file and the sliced files of the live streaming.

It should be noted that the live source station server 101, the HLS source station server 102, and the object storage server 103 may be hardware or software. When the live source station server 101, the HLS source station server 102, and the object storage server 103 are hardware, the live source station server, the HLS source station server, and the object storage server may be implemented as a distributed server cluster composed of a plurality of servers, or be implemented as a single server. When the live source station server 101, the HLS source station server 102, and the object storage server 103 are software, the live source station server, the HLS source station server, and the object storage server may be implemented as a plurality of software programs or software modules (e.g., software programs or software modules for providing distributed services), or be implemented as a single software program or software module. This is not specifically limited here.

It should be noted that the method for slicing live streaming according to the embodiment of the present disclosure is generally executed by the HLS source station server 102. Accordingly, the apparatus for slicing live streaming is generally provided in the HLS source station server 102.

It should be understood that the numbers of live source station servers, HLS source station servers, object storage servers, and networks in FIG. 1 are merely illustrative. Any number of live source station servers, HLS source station servers, object storage servers, and networks may be provided based on actual requirements.

Figure 2:
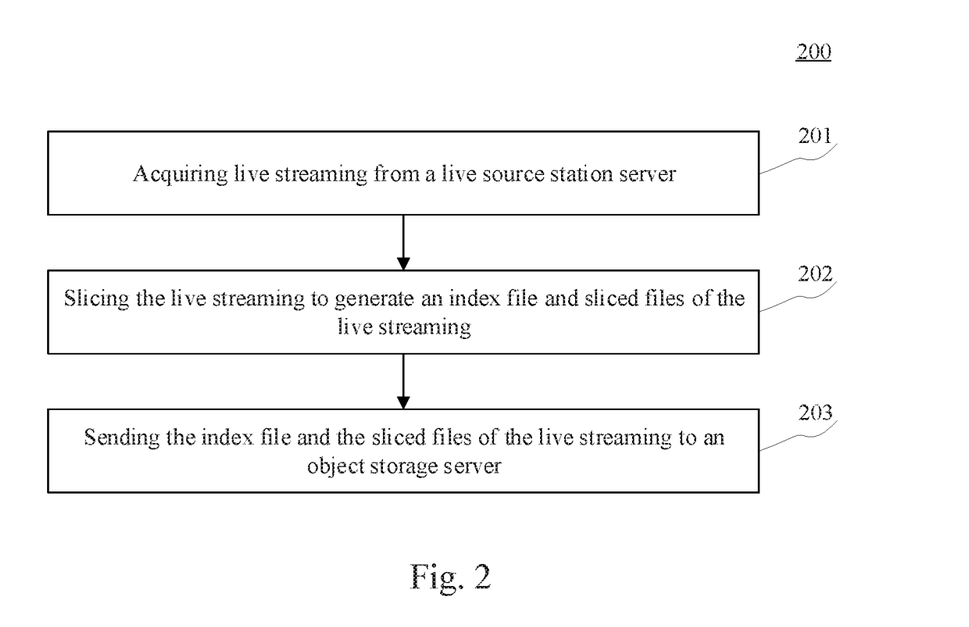
FIG. 2 is a flowchart of a method for slicing live streaming according to an embodiment of the present disclosure.

Further referring to FIG. 2, a process 200 of a method for slicing live streaming according to an embodiment of the present disclosure is shown. The method for slicing live streaming is applied to an HLS source station server, and includes the following steps.

Step 201: acquiring live streaming from a live source station server.

In the present embodiment, the HLS source station server (e.g., the HLS source station server 102 shown in FIG. 1) may acquire the live streaming from a live source station server (e.g., the live source station server 101 shown in FIG. 1). The live streaming may be a live video recorded by a live stream providing user using his terminal device. Generally, the live stream providing user may push stream to the live source station server using his terminal device. The HLS source station server may pull stream from the live source station server. Specifically, the live stream providing user may send a request for pushing stream to the live source station server using his terminal device. The request for pushing stream may include the live streaming. The live source station server may extract the live streaming from the request for pushing stream, and store the live streaming. The HLS source station server may send a request for pulling stream to the live source station server. The request for pulling stream may include an identifier of requested live streaming. After receiving the request for pulling stream, the live source station server may find out locally stored requested live streaming based on the identifier of the requested live streaming, and send the requested live streaming to the HLS source station server.

In practice, the HLS source station server may actively pull stream, or passively pull stream. The so-called actively pulling stream means that the HLS source station server may actively sense the live streaming stored in the live source station server, and pulls stream to the live source station server after sensing the live streaming. The so-called passively pulling stream means that in the case of receiving a live stream request initiated by a live stream viewing user, and determining that the object storage server (e.g., the object storage server 103 shown in FIG. 1) fails to store an index file of the requested live streaming, the HLS source station server may pull stream to the live source station server.

Step 202: slicing the live streaming to generate an index file and sliced files of the live streaming.

In the present embodiment, the HLS source station server may slice the live streaming to generate the index file and the sliced files of the live streaming. The index file may be a M3U8 file. The sliced files may be TS files. In general, the TS files may be found based on an index recorded in the M3U8 file, and the found TS files are ceaselessly played in sequence to achieve playing the live streaming.

In practice, the HLS protocol pulls stream from the HLS source station server to the live source station server, and slices the live streaming to generate the index file and the sliced files of the live streaming, which are referred to as the HLS center slices. Generally, two modes of the HLS center slices may be designed: an actively triggering slice and a passively triggering slice. The actively triggering slice means that the HLS source station server actively pulls stream from the live source station server, and slices the live streaming that actively pulls stream. The actively triggering slice may directly eliminate first screen delay overheads of the live stream viewing user caused by cold streaming start, and greatly enhance the user experience. The passively triggering slice means that the HLS source station server passively pulls stream from the live source station server, and slices the live streaming that passively pulls stream. The passively pulling stream may slice the live streaming as required, and can save server and storage resources.

Step 203: sending the index file and the sliced files of the live streaming to an object storage server.

In the present embodiment, the HLS source station server may send the index file and the sliced files of the live streaming to the object storage server, such that the object storage server stores the index file and the sliced files of the live streaming. The object storage server may be a BOS (Baidu Object Storage) server. When the live stream viewing user initiates the live stream request, the HLS source station server may find the index file and the sliced files of the requested live streaming from the object storage server, and return the index file and the sliced file to a terminal device of the live stream viewing user. The terminal device of the live stream viewing user plays the sliced files of the live streaming based on the index file of the live streaming, to achieve live stream.

The method for slicing live streaming provided in the embodiment of the present disclosure first acquires the live streaming by a HLS source station server from a live source station server; then slices the live streaming to generate an index file and sliced files of the live streaming; and finally sends the index file and the sliced files of the live streaming to an object storage server, such that the object storage server stores the index file and the sliced files of the live streaming. The live streaming is sliced by the HLS source station server, and the obtained index file and sliced files are stored by the object storage server. When a terminal device of a live stream viewing user initiates a live stream request, the HLS source station server acquires the live streaming from the live source station server, slices the live streaming to generate a M3U8 file and TS files of requested live streaming, or acquires the M3U8 file and the TS files of the requested live streaming from the object storage server, and returns the M3U8 file and the TS files to the terminal device of the live stream viewing user, thus contributing to reducing the delay in live stream, and greatly enhancing the availability of the live stream service. Moreover, the architecture is easy to expand other live stream services, and can support time-shifting playback. At the same time, two modes of the HLS center slices may be designed: an actively triggering slice and a passively triggering slice. The actively triggering slice may directly eliminate first screen delay overheads of the live stream viewing user caused by cold streaming start, and greatly enhance the user experience. The passively triggering slice may slice the live streaming as required, and can save server and storage resources.

Figure 3:
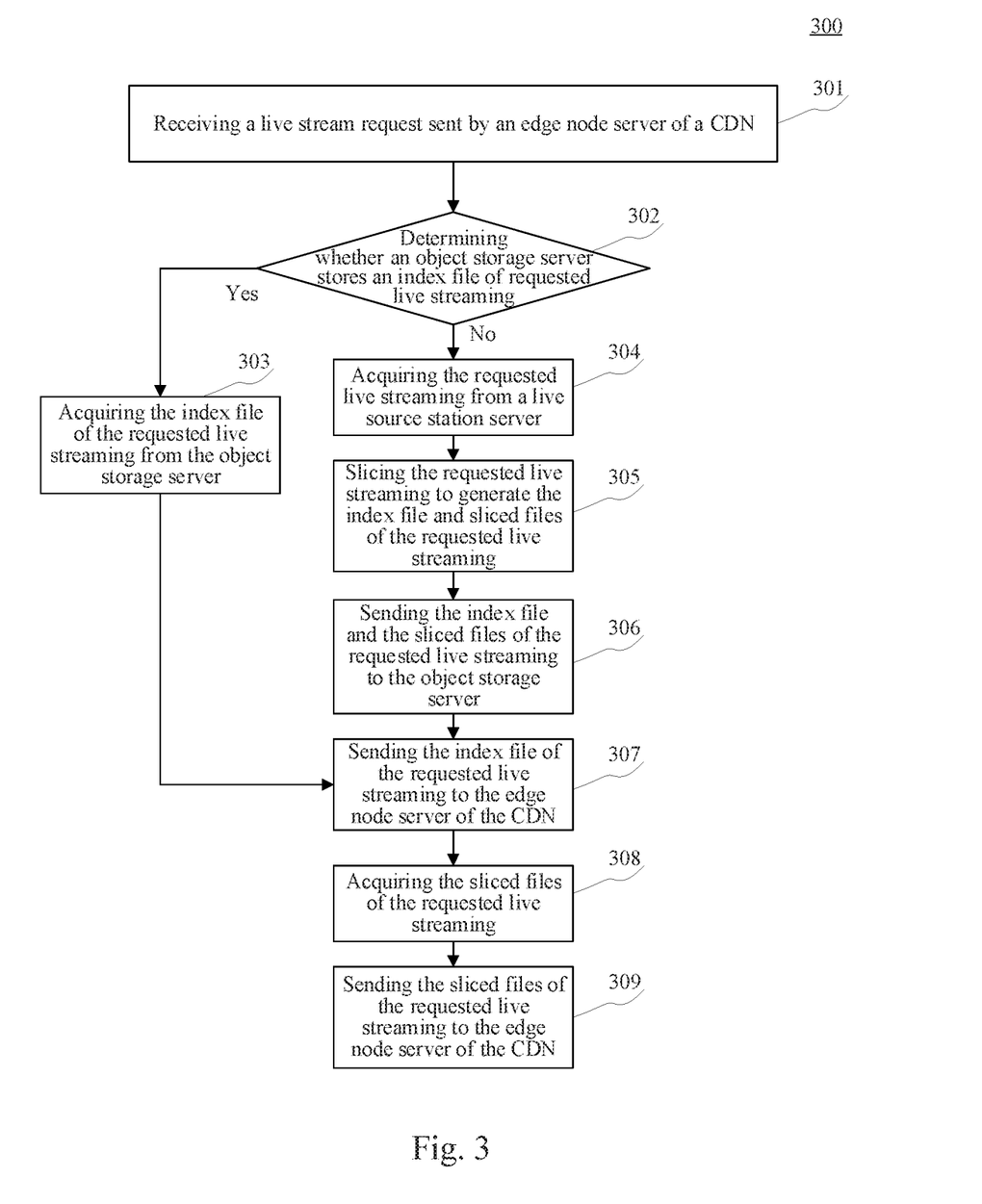
FIG. 3 is a flowchart of the method for slicing live streaming according to another embodiment of the present disclosure.

Further referring to FIG. 3, a process 300 of the method for slicing live streaming according to another embodiment of the present disclosure is shown. The method for slicing live streaming is applied to an HLS source station server, and includes the following steps.

Step 301: receiving a live stream request sent by an edge node server of a CDN.

In the present embodiment, the HLS source station server (e.g., the HLS source station server 102 shown in FIG. 1) may receive the live stream request sent by the edge node server of the CDN. Generally, the edge node of the CDN may include a load balancing server and a back-end streaming server. The edge node server of the CDN may be a load balancing server in the edge node of the CDN. The live stream request may be sent by a terminal device of a live stream viewing user to the edge node server of the CDN, and includes an identifier of requested live streaming. Specifically, the terminal device of the live stream viewing user may send the live stream request to the edge node server of the CDN, and the edge node server of the CDN may forward the live stream request to the HLS source station server.

Step 302: determining whether an object storage server stores an index file of requested live streaming.

In the present embodiment, the HLS source station server may determine whether the object storage server (e.g., the object storage server 103 shown in FIG. 1) stores the index file of the requested live streaming. If the object storage server stores the index file of the requested live streaming, then step 303 is executed; and if the object storage server does not store the index file of the requested live streaming, then step 304 is executed.

Step 303: acquiring the index file of the requested live streaming from the object storage server.

In the present embodiment, in response to that the object storage server stores the index file of the requested live streaming, the HLS source station server may acquire the index file of the requested live streaming from the object storage server, and continue to execute step 307.

Step 304: acquiring the requested live streaming from a live source station server.

In the present embodiment, in response to that the object storage server does not store the index file of the requested live streaming, the HLS source station server may passively pull stream to the live source station server (e.g., the live source station server 101 shown in FIG. 1), to acquire the requested live streaming.

Step 305: slicing the requested live streaming to generate the index file and sliced files of the requested live streaming.

In the present embodiment, the HLS source station server may slice the requested live streaming to generate the index file and the sliced files of the requested live streaming.

Step 306: sending the index file and the sliced files of the requested live streaming to the object storage server.

In the present embodiment, the HLS source station server may send the index file and the sliced files of the requested live streaming to the object storage server, such that the object storage server stores the index file and the sliced files of the live streaming. Moreover, the HLS source station server may continue to execute step 307.

Step 307: sending the index file of the requested live streaming to the edge node server of the CDN.

In the present embodiment, the HLS source station server may send the index file of the requested live streaming to the edge node server of the CDN, such that the edge node server of the CDN sends the index file of the requested live streaming to the terminal device of the live stream viewing user.

Step 308: acquiring the sliced files of the requested live streaming.

In the present embodiment, the HLS source station server may acquire the sliced files of the requested live streaming. In general, if the object storage server stores the index file of the requested live streaming, after sending the index file of requested live streaming to the edge node server of the CDN, the HLS source station server may further acquire the sliced files of the requested live streaming from the object storage server. If the object storage server does not store the index file of the requested live streaming, after sending the index file of the requested live streaming to the edge node server of the CDN, the HLS source station server may further acquire the requested live streaming, and slice the requested live streaming to generate the sliced files.

Step 309: sending the sliced files of the requested live streaming to the edge node server of the CDN.

In the present embodiment, the HLS source station server may send the sliced files of the requested live streaming to the edge node server of the CDN, such that the edge node server of the CDN sends the sliced files of the requested live streaming to the terminal device of the live stream viewing user.

As can be seen from FIG. 3, compared with the corresponding embodiment of FIG. 2, the process 300 of the method for slicing live streaming in the present embodiment additionally provides steps 301-303 and steps 307-309. Thus, in the case of receiving the live stream request initiated by the live stream viewing user, and determining the object storage server failing to store the index file of the requested live streaming, the HLS source station server may pull stream from the live source station server, slice the live streaming to generate the index file and the sliced files of the live streaming, and return the index file and the sliced files to the live stream viewing user, such that the live stream viewing user plays the sliced files based on the index file, to achieve playing the live streaming. The live streaming is sliced as required, to save server and storage resources.

Figure 4:
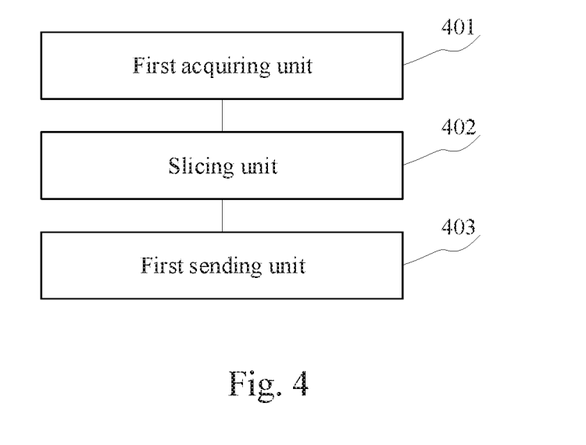
FIG. 4 is a schematic structural diagram of an apparatus for slicing live streaming according to an embodiment of the present disclosure.

Further referring to FIG. 4, as an implementation of the method shown in the above figures, an embodiment of the present disclosure provides an apparatus for slicing live streaming. The embodiment of the apparatus corresponds to the embodiment of the method shown in FIG. 2. The apparatus may be specifically applied to various electronic devices.

As shown in FIG. 4, the apparatus 400 for slicing live streaming in the present embodiment may include: a first acquiring unit 401, a slicing unit 402, and a first sending unit 403. The first acquiring unit 401 is configured to acquire the live streaming from a live source station server; the slicing unit 402 is configured to slice the live streaming to generate an index file and sliced files of the live streaming; and the first sending unit 403 is configured to send the index file and the sliced files of the live streaming to an object storage server, to cause the object storage server to store the index file and the sliced files of the live streaming.

The specific processing of the first acquiring unit 401, the slicing unit 402, and the first sending unit 403 of the apparatus 400 for slicing live streaming in the present embodiment and the technical effects thereof may refer to the related description of step 201, step 202, and step 203 in the corresponding embodiment of FIG. 2, which will not be repeatedly described here.

In some alternative implementations of the present embodiment, the apparatus 400 for slicing live streaming further includes: a receiving unit (not shown in the figure) configured to receive a live stream request sent by an edge node server of a CDN, where the live stream request is sent by a terminal device of a live stream viewing user to the edge node server of the CDN; a determining unit (not shown in the figure) configured to determine whether the object storage server stores an index file of requested live streaming; a second acquiring unit (not shown in the figure) configured to acquire, in response to that the object storage server stores the index file of the requested live streaming, the index file of the requested live streaming from the object storage server; and a second sending unit (not shown in the figure) configured to send the index file of the requested live streaming to the edge node server of the CDN, to cause the edge node server of the CDN to send the index file of the requested live streaming to the terminal device.

In some alternative implementations of the present embodiment, the first acquiring unit 401 is further configured to: acquire, in response to that the object storage server does not store the index file of the requested live streaming, the requested live streaming from the live source station server.

In some alternative implementations of the present embodiment, the apparatus 400 for slicing live streaming further includes: a third acquiring unit (not shown in the figure) configured to acquire the sliced files of the requested live streaming; and a third sending unit (not shown in the figure) configured to send the sliced files of the requested live streaming to the edge node server of the CDN, to cause the edge node server of the CDN to send the sliced files of the requested live streaming to the terminal device.

Figure 5:
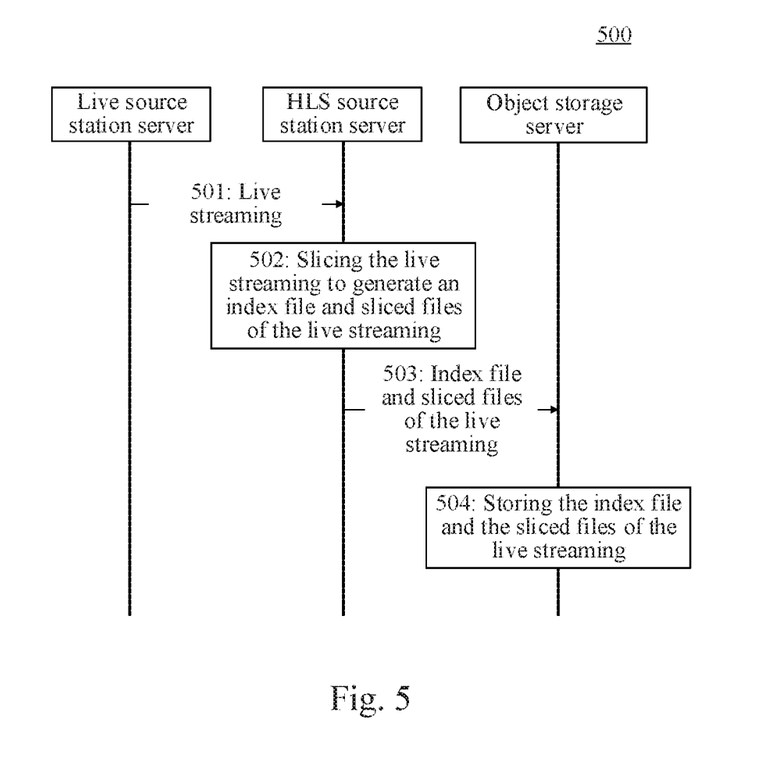
FIG. 5 is a sequence chart of a system for slicing live streaming according to an embodiment of the present disclosure.

Further referring to FIG. 5, a timing sequence 500 of a system for slicing live streaming according to an embodiment of the present disclosure is shown. The system for slicing live streaming includes a live source station server (e.g., the live source station server 101 shown in FIG. 1), an HLS source station server (e.g., the HLS source station server 102 shown in FIG. 1), and an object storage server (e.g., the object storage server 103 shown in FIG. 1). The HLS source station server is configured to acquire the live streaming from the live source station server, slice the live streaming to generate an index file and sliced files of the live streaming, and send the index file and the sliced files of the live streaming to the object storage server; and the object storage server is configured to store the index file and the sliced files of the live streaming.

As shown in FIG. 5, in step 501, the HLS source station server acquires live streaming from a live source station server.

In the present embodiment, the HLS source station server may acquire the live streaming from the live source station server. The live streaming may be a live video recorded by a live stream providing user using his terminal device. Generally, the live stream providing user may push stream to the live source station server using his terminal device. The HLS source station server may pull stream from the live source station server. Specifically, the live stream providing user may send a request for pushing stream to the live source station server using his terminal device. The request for pushing stream may include the live streaming. The live source station server may extract the live streaming from the request for pushing stream, and store the live streaming. The HLS source station server may send a request for pulling stream to the live source station server. The request for pulling stream may include an identifier of requested live streaming. After receiving the request for pulling stream, the live source station server may find out locally stored requested live streaming based on the identifier of the requested live streaming, and send the requested live streaming to the HLS source station server.

In practice, the HLS source station server may actively pull stream, or passively pull stream. The so-called actively pulling stream means that the HLS source station server may actively sense the live streaming stored in the live source station server, and pulls stream to the live source station server after sensing the live streaming. The so-called passively pulling stream means that in the case of receiving a live stream request initiated by a live stream viewing user, and determining that the object storage server fails to store the index file of the requested live streaming, the HLS source station server may pull stream to the live source station server.

In step 502, the HLS source station server slices the live streaming to generate an index file and sliced files of the live streaming.

In the present embodiment, the HLS source station server may slice the live streaming to generate the index file and the sliced files of the live streaming. The index file may be a M3U8 file. The sliced files may be TS files. In general, the TS files may be found based on an index recorded in the M3U8 file, and the found TS files are ceaselessly played in sequence to achieve playing the live streaming.

In practice, the HLS protocol pulls stream from the HLS source station server to the live source station server, and slices the live streaming to generate the index file and the sliced files of the live streaming, which are referred to as the HLS center slices. Generally, two modes of the HLS center slices may be designed: an actively triggering slice and a passively triggering slice. The actively triggering slice means that the HLS source station server actively pulls stream from the live source station server, and slices the live streaming that actively pulls stream. The actively triggering slice may directly eliminate first screen delay overheads of the live stream viewing user caused by cold streaming start, and greatly enhance the user experience. The passively triggering slice means that the HLS source station server passively pulls stream from the live source station server, and slices the live streaming that passively pulls stream. The passively pulling stream may slice the live streaming as required, and can save server and storage resources.

In step 503, the HLS source station server sends the index file and the sliced files of the live streaming to the object storage server.

In the present embodiment, the HLS source station server may send the index file and the sliced files of the live streaming to the object storage server.

In step 504, the object storage server stores the index file and the sliced files of the live streaming.

In the present embodiment, the object storage server may be configured to store the index file and the sliced files of the live streaming. The object storage server may be a BOS (Baidu Object Storage) server. When the live stream viewing user initiates the live stream request, the HLS source station server may find the index file and the sliced files of the requested live streaming from the object storage server, and return the index file and the sliced file to a terminal device of the live stream viewing user. The terminal device of the live stream viewing user plays the sliced files of the live streaming based on the index file of the live streaming, to achieve live stream.

The system for slicing live streaming provided in the embodiment of the present disclosure first acquires the live streaming by a HLS source station server from a live source station server; then slices the live streaming to generate an index file and sliced files of the live streaming; and finally sends the index file and the sliced files of the live streaming to an object storage server. The object storage server may store the index file and the sliced files of the live streaming. The live streaming is sliced by the HLS source station server, and the obtained index file and sliced files are stored by the object storage server. When a terminal device of a live stream viewing user initiates a live stream request, the HLS source station server acquires the live streaming from the live source station server, slices the live streaming to generate a M3U8 file and TS files of requested live streaming, or acquires the M3U8 file and the TS files of the requested live streaming from the object storage server, and returns the M3U8 file and the TS files to the terminal device of the live stream viewing user, thus contributing to reducing the delay in live stream, and greatly enhancing the availability of the live stream service. Moreover, the architecture is easy to expand other live stream services, and can support time-shifting playback. At the same time, two modes of the HLS center slices may be designed: an actively triggering slice and a passively triggering slice. The actively triggering slice may directly eliminate first screen delay overheads of the live stream viewing user caused by cold streaming start, and greatly enhance the user experience. The passively triggering slice may slice the live streaming as required, and can save server and storage resources.

Figure 6:
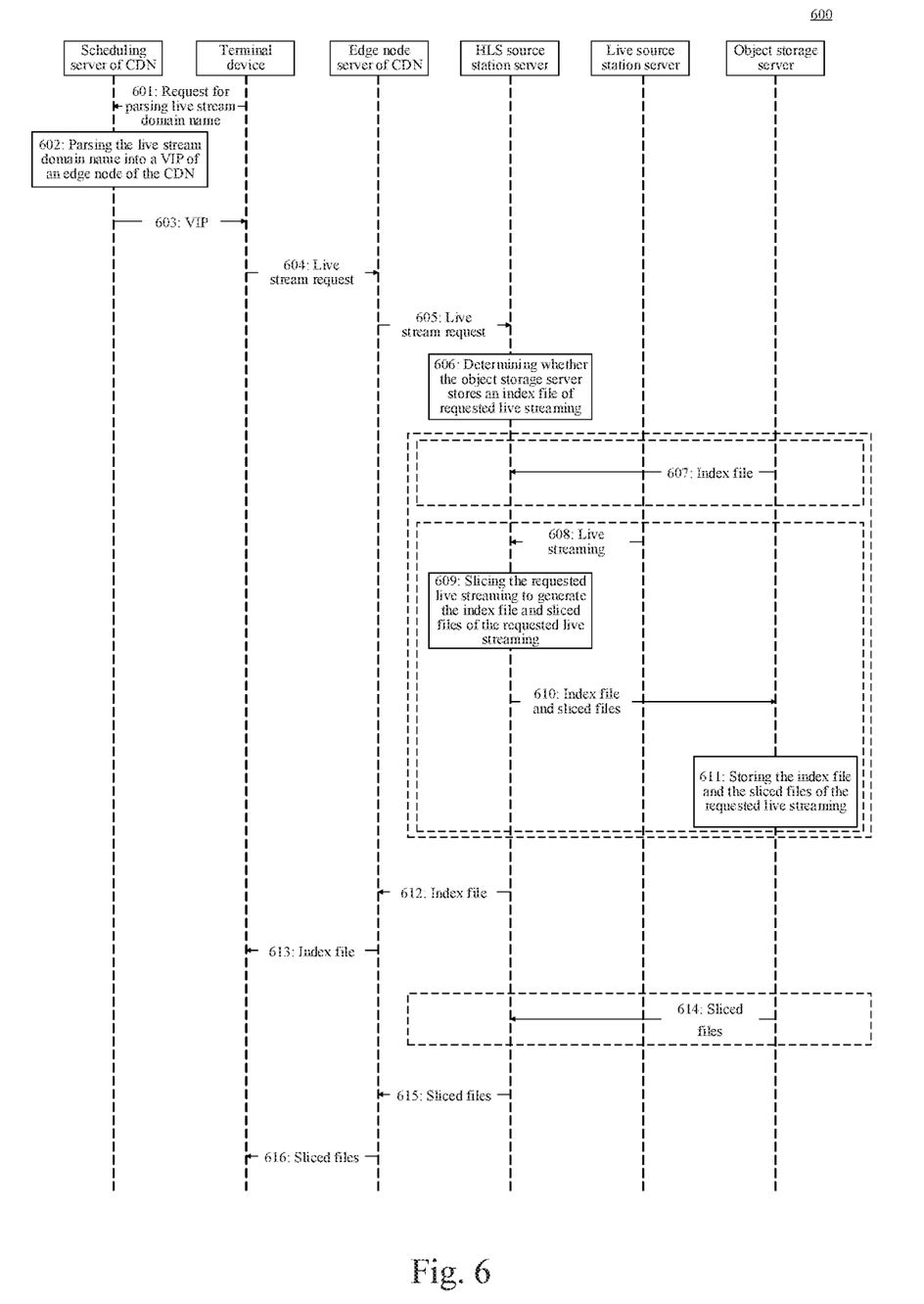
FIG. 6 is a sequence chart of the system for slicing live streaming according to another embodiment of the present disclosure.

Further referring to FIG. 6, a timing sequence 600 of the system for slicing live streaming according to another embodiment of the present disclosure is shown. The system for slicing live streaming includes a live source station server (e.g., the live source station server 101 shown in FIG. 1), an HLS source station server (e.g., the HLS source station server 102 shown in FIG. 1), an object storage server (e.g., the object storage server 103 shown in FIG. 1), a terminal device of a live stream viewing user (not shown in FIG. 1), a scheduling server of a CDN (not shown in FIG. 1), and an edge node server of the CDN (not shown in FIG. 1). The terminal device is configured to send a request for parsing a live stream domain name to the scheduling server of the CDN, where the request for parsing a live stream domain name includes the live stream domain name; the scheduling server of the CDN is configured to parse the live stream domain name into a virtual Internet protocol address (VIP) of an edge node of the CDN, and send the VIP to the terminal device; the terminal device is further configured to send a live stream request to the edge node server of the CDN based on the VIP; the edge node server of the CDN is configured to send the live stream request to the HLS source station server; the HLS source station server is further configured to determine whether the object storage server stores the index file of requested live streaming, acquire, in response to that the object storage server stores the index file of the requested live streaming, the index file of the requested live streaming from the object storage server, acquire, in response to that the object storage server does not store the index file of the requested live streaming, the requested live streaming from the live source station server, slice the requested live streaming to generate the index file and sliced files of the requested live streaming, and send the index file and the sliced files of the requested live streaming to the object storage server to store the index file and the sliced files of the live streaming; the edge node server of the CDN is further configured to acquire the index file of the requested live streaming from the HLS live source station server, and send the index file of the requested live streaming to the terminal device; the HLS source station server is further configured to acquire the sliced files of the requested live streaming, and send the sliced files of the requested live streaming to the edge node server of the CDN; and the edge node server of the CDN is further configured to send the sliced files of the requested live streaming to the terminal device.

As shown in FIG. 6, in step 601, the terminal device sends the request for parsing a live stream domain name to the scheduling server of the CDN.

In the present embodiment, the terminal device of the live stream viewing user may send the request for parsing a live stream domain name to the scheduling server of the CDN. The request for parsing a live stream domain name may include the live stream domain name.

In step 602, the scheduling server of the CDN parses the live stream domain name into a VIP of an edge node of the CDN.

In the present embodiment, the scheduling server of the CDN may parse the live stream domain name into the VIP (Virtual Internet Protocol Address) of the edge node of the CDN. Generally, the scheduling server of the CDN may parse the live stream domain name into a VIP of an optimum edge node of the CDN. The optimum edge node of the CDN may be an edge node of the CDN meeting a preset condition. The preset condition may be various pre-established conditions. For example, the preset condition may include, but is not limited to, at least one of following items: closest to the live stream viewing user, or a node state being an idle state, or the like.

In step 603, the scheduling server of the CDN sends the VIP to the terminal device.

In the present embodiment, the scheduling server of the CDN may send the VIP to the terminal device of the live stream viewing user.

In step 604, the terminal device sends the live stream request to the edge node server of the CDN based on the VIP.

In the present embodiment, the terminal device of the live stream viewing user may send the live stream request to an edge node server of the CDN corresponding to the VIP. Generally, the edge node of the CDN may include a load balancing server and a back-end streaming server. The edge node server of the CDN may be a load balancing server in the edge node of the CDN. The live stream request may include an identifier of the requested live streaming.

In step 605, the edge node server of the CDN sends the live stream request to the HLS source station server.

In the present embodiment, the edge node server of the CDN may send the live stream request to the HLS source station server.

In step 606, the HLS source station server determines whether the object storage server stores an index file of requested live streaming.

In the present embodiment, the HLS source station server may determine whether the object storage server stores the index file of the requested live streaming. If the object storage server stores the index file of the requested live streaming, then step 607 is executed; and if the object storage server does not store the index file of the requested live streaming, then step 608 is executed.

In step 607, the HLS source station server acquires the index file of requested live streaming from the object storage server.

In the present embodiment, if the object storage server stores the index file of the requested live streaming, the HLS source station server may acquire the index file of the requested live streaming from the object storage server.

In step 608, the HLS source station server acquires the requested live streaming from the live source station server.

In the present embodiment, if the object storage server does not store the index file of the requested live streaming, the HLS source station server may passively pull stream to the live source station server, to acquire the requested live streaming.

In step 609, the HLS source station server slices the requested live streaming to generate the index file and sliced files of the requested live streaming.

In the present embodiment, the HLS source station server may slice the requested live streaming to generate the index file and the sliced files of the requested live streaming.

In step 610, the HLS source station server sends the index file and the sliced files of the requested live streaming to the object storage server.

In the present embodiment, the HLS source station server may send the index file and the sliced files of the requested live streaming to the object storage server.

In step 611, the object storage server stores the index file and the sliced files of the requested live streaming.

In the present embodiment, the object storage server may store the index file and the sliced files of the requested live streaming.

In step 612, the edge node server of the CDN acquires the index file of the requested live streaming from the HLS live source station server.

In the present embodiment, the edge node server of the CDN may acquire the index file of the requested live streaming from the HLS live source station server.

In step 613, the edge node server of the CDN sends the index file of the requested live streaming to the terminal device.

In the present embodiment, the edge node server of the CDN may send the index file of the requested live streaming to the terminal device.

In step 614, the HLS source station server acquires the sliced files of the requested live streaming.

In the present embodiment, the HLS source station server may acquire the sliced files of the requested live streaming. In general, if the object storage server stores the index file of the requested live streaming, after sending the index file of requested live streaming to the edge node server of the CDN, the HLS source station server may further acquire the sliced files of the requested live streaming from the object storage server. If the object storage server does not store the index file of the requested live streaming, after sending the index file of the requested live streaming to the edge node server of the CDN, the HLS source station server may further acquire the requested live streaming, and slice the requested live streaming to generate the sliced files.

In step 615, the HLS source station server sends the sliced files of the requested live streaming to the edge node server of the CDN.

In the present embodiment, the HLS source station server may send the sliced files of the requested live streaming to the edge node server of the CDN.

In step 616, the edge node server of the CDN sends the sliced files of the requested live streaming to the terminal device.

In the present embodiment, the edge node server of the CDN may send the sliced files of the requested live streaming to the terminal device of the live stream viewing user.

As can be seen from FIG. 6, compared with the corresponding embodiment of FIG. 5, the timing sequence 600 of the system for slicing live streaming in the present embodiment additionally provides steps 601-607 and steps 612-616. Thus, in the case of receiving the live stream request initiated by the live stream viewing user, and determining the object storage server failing to store the index file of the requested live streaming, the HLS source station server may pull stream from the live source station server, slice the live streaming to generate the index file and the sliced files of the live streaming, and return the index file and the sliced files to the live stream viewing user, such that the live stream viewing user plays the sliced files based on the index file, to achieve playing the live streaming. The live streaming is sliced as required, to save server and storage resources.

Figure 7:
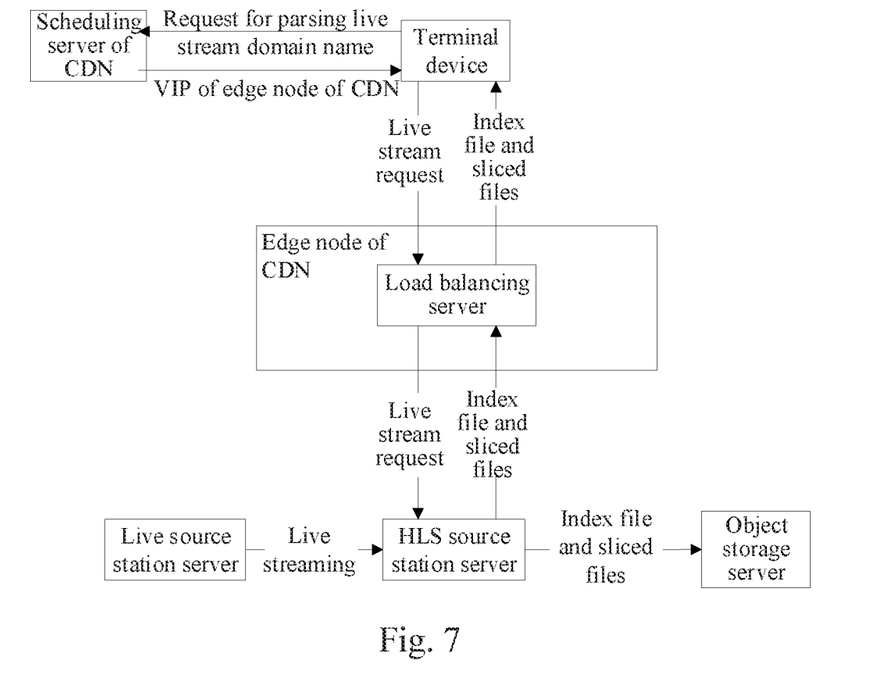
FIG. 7 is a schematic diagram of an application scenario of the system for slicing live streaming shown in FIG. 6.

Further referring to FIG. 7, FIG. 7 is a schematic diagram of an application scenario of the system for slicing live streaming shown in FIG. 6. In the application scenario shown in FIG. 7, the terminal device of the live stream viewing user may send the request for parsing a live stream domain name to the scheduling server of the CDN. The scheduling server of the CDN parses the live stream domain name in the request for parsing a live stream domain name into the VIP of the edge node of the CDN, and returns the VIP to the terminal device of the live stream viewing user. Then, the terminal device of the live stream viewing user may send the live stream request to a load balancing server of the edge node of the CDN based on the VIP. The load balancing server sends the live stream request to the HLS source station server. If the object storage server does not store the index file of the requested live streaming, the HLS source station server acquires the requested live streaming from the live source station server, slice the requested live streaming to generate the index file and the sliced files of the requested live streaming, and send the index file and the sliced files to the object storage server and the load balancing server. Finally, the object storage server stores the index file and the sliced files. Moreover, the load balancing server sends the index file and the sliced files to the terminal device of the live stream viewing user. The terminal device of the live stream viewing user plays the sliced files based on the index file, to achieve playing the live streaming for viewing by the live stream viewing user.

Figure 8:
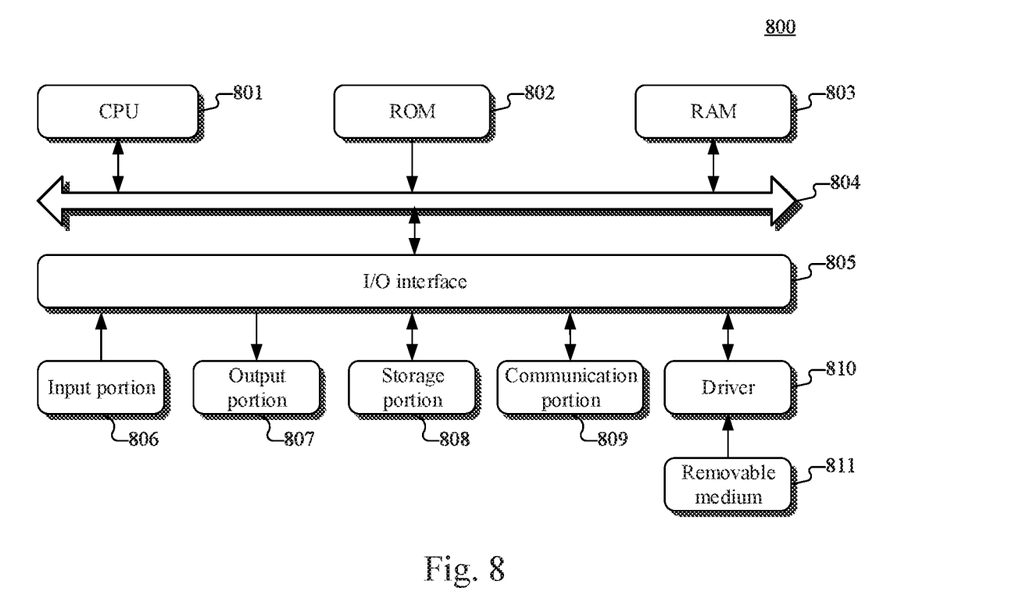
FIG. 8 is a schematic structural diagram of a computer system adapted to implement a server of the embodiments of the present disclosure.

Referring to FIG. 8 below, a schematic structural diagram of a computer system 800 adapted to implement a server (e.g., the HLS source station server 102 shown in FIG. 1) of the embodiments of the present disclosure is shown. The server shown in FIG. 8 is merely an example, and should not limit the functions and scope of use of the embodiments of the present disclosure.

As shown in FIG. 8, the computer system 800 includes a central processing unit (CPU) 801, which may execute various appropriate actions and processes in accordance with a program stored in a read only memory (ROM) 802 or a program loaded into a random access memory (RAM) 803 from a storage portion 808. The RAM 803 further stores various programs and data required by operations of the system 800. The CPU 801, the ROM 802, and the RAM 803 are connected to each other through a bus 804. An input/output (I/O) interface 805 is also connected to the bus 804.

The following components are connected to the I/O interface 805: an input portion 806 including a keyboard, a mouse, or the like; an output portion 807 including a cathode ray tube (CRT), a liquid crystal display device (LCD), a speaker, or the like; a storage portion 808 including a hard disk, or the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810 as required, such that a computer program read therefrom is installed in the storage portion 808 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication portion 809, and/or may be installed from the removable medium 811. The computer program, when executed by the central processing unit (CPU) 801, implements the above functions defined by the method of the embodiments of the present disclosure. It should be noted that the computer readable medium according to the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the present disclosure, the computer readable medium may be any tangible medium containing or storing programs, which may be used by a command execution system, apparatus or element, or incorporated thereto. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including a first acquiring unit, a slicing unit, and a first sending unit. The names of the units do not constitute a limitation to such units themselves in some cases. For example, the first acquiring unit may be further described as "a unit configured to acquire live streaming from a live source station server."

In another aspect, the present disclosure further provides a computer readable medium. The computer readable medium may be included in the server in the above described embodiments, or a stand-alone computer readable medium without being assembled into the server. The computer readable medium stores one or more programs. The one or more programs, when executed by the server, cause the server to: acquire the live streaming from the live source station server; slice the live streaming to generate an index file and sliced files of the live streaming; and send the index file and the sliced files of the live streaming to an object storage server, to cause the object storage server to store the index file and the sliced files of the live streaming.

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A method for slicing live streaming, the method being applied to an HTTP Live Streaming (HLS) source station server, and comprising:
   acquiring, by the HLS source station server, the live streaming from a live source station server;
   slicing, by the HLS source station server, the live streaming, and pulling stream actively or passively from the live source station server based on delay requirement, to generate the an index file and sliced files of the live streaming, the slicing including an actively triggering slicing and a passively triggering slicing; and
   sending, by the HLS source station server, the index file and the sliced files of the live streaming to an object storage server, to cause the object storage server to store the index file and the sliced files of the live streaming.

2. The method according to claim 1, wherein the method further comprises:
   receiving a live stream request sent by an edge node server of a Content Delivery Network (CDN), wherein the live stream request is sent by a terminal device of a live stream viewing user to the edge node server of the CDN;
   determining whether the object storage server stores an index file of requested live streaming;
   acquiring, in response to that the object storage server stores the index file of the requested live streaming, the index file of the requested live streaming from the object storage server; and
   sending the index file of the requested live streaming to the edge node server of the CDN, to cause the edge node server of the CDN to send the index file of the requested live streaming to the terminal device.

3. The method according to claim 2, wherein the acquiring, by the HLS source station server, the live streaming from a live source station server comprises:
   acquiring by the HLS source station server, in response to that the object storage server does not store the index file of the requested live streaming, the requested live streaming from the live source station server.

4. The method according to claim 2, wherein the method further comprises:
   acquiring sliced files of the requested live streaming; and
   sending the sliced files of the requested live streaming to the edge node server of the CDN, to cause the edge node server of the CDN to send the sliced files of the requested live streaming to the terminal device.

5. A non-transitory computer readable medium, storing a computer program thereon, wherein the computer program, when executed by a process, implements the method according to claim 1.

6. An apparatus for slicing a live streaming, the apparatus being provided in an HTTP Live Streaming (HLS) source station server, and comprising:
   at least one processor; and
   a memory storing instructions, wherein the instructions when executed by the at least one processor, cause the at least one processor to perform operations, the operations comprising:
   acquiring the live streaming from a live source station server;
   slicing the live streaming, and pulling stream actively or passively from the live source station server based on delay requirement, to generate an index file and sliced files of the live streaming, the slicing including an actively triggering slicing and a passively triggering slicing; and
   sending the index file and the sliced files of the live streaming to an object storage server, to cause the object storage server to store the index file and the sliced files of the live streaming.

7. The apparatus according to claim 6, wherein the operations further comprise:
   receiving a live stream request sent by an edge node server of a Content Delivery Network (CDN), wherein the live stream request is sent by a terminal device of a live stream viewing user to the edge node server of the CDN;
   determining whether the object storage server stores an index file of requested live streaming;
   acquiring, in response to that the object storage server stores the index file of the requested live streaming, the index file of the requested live streaming from the object storage server; and
   sending the index file of the requested live streaming to the edge node server of the CDN, to cause the edge node server of the CDN to send the index file of the requested live streaming to the terminal device.

8. The apparatus according to claim 7, wherein the acquiring the live streaming from a live source station server comprises:
   acquiring, in response to that the object storage server does not store the index file of the requested live streaming, the requested live streaming from the live source station server.

9. The apparatus according to claim 7, wherein the operations further comprise:
   acquiring sliced files of the requested live streaming; and
   sending the sliced files of the requested live streaming to the edge node server of the CDN, to cause the edge node server of the CDN to send the sliced files of the requested live streaming to the terminal device.

10. A system for slicing a live streaming, comprising a live source station server, an HTTP Live Streaming (HLS) source station server, and an object storage server; wherein:

the HLS source station server comprises at least one processor; and the at least one processor is configured to acquire the live streaming from the live source station server, slice the live streaming, and pull stream actively or passively from the live source station server based on delay requirement, to generate an index file and sliced files of the live streaming, and send the index file and the sliced files of the live streaming to an object storage server, the slice including an actively triggering slice and a passively triggering slice; and the object storage server is configured to store the index file and the sliced files of the live streaming.

11. The system according to claim 10, wherein the system further comprises a terminal device of a live stream viewing user, a scheduling server of a Content Delivery Network (CDN), and an edge node server of the CDN; wherein:

the terminal device is configured to send a request for parsing a live stream domain name to the scheduling server of the CDN, wherein the request for parsing a live stream domain name comprises a live stream domain name;

the scheduling server of the CDN is configured to parse the live stream domain name into a Virtual Internet Protocol Address (VIP) of the edge node of the CDN, and send the VIP to the terminal device;

the terminal device is further configured to send a live stream request to the edge node server of the CDN based on the VIP;

the edge node server of the CDN is configured to send the live stream request to the HLS source station server;

the HLS source station server is further configured to determine whether the object storage server stores an index file of requested live streaming, and acquire, in response to that the object storage server stores the index file of the requested live streaming, the index file of the requested live streaming from the object storage server; and the edge node server of the CDN is further configured to acquire the index file of the requested live streaming from the HLS live source station server, and send the index file of the requested live streaming to the terminal device.

12. The system according to claim 11, wherein the HLS source station server is further configured to acquire, in response to that the object storage server does not store the index file of the requested live streaming, the requested live streaming from the live source station server.

13. The system according to claim 11, wherein the HLS source station server is further configured to acquire sliced files of the requested live streaming, and send the sliced files of the requested live streaming to the edge node server of the CDN; and the edge node server of the CDN is further configured to send the sliced files of the requested live streaming to the terminal device.

* * * * *

UNITED STATES PATENT AND TRADEMARK OFFICE
CERTIFICATE OF CORRECTION

PATENT NO. : 11,356,748 B2
APPLICATION NO. : 16/675840
DATED : June 7, 2022
INVENTOR(S) : Zhenliang Jiang and Huifeng Shen It is certified that error appears in the above-identified patent and that said Letters Patent is hereby corrected as shown below:

In the Claims

At Column 17, Line 38 (Claim 1, Line 9), please delete "to generate the an index file" and insert --to generate an index file-- therefor.

Signed and Sealed this
Thirteenth Day of December, 2022

Katherine Kelly Vidal
*Director of the United States Patent and Trademark Office*